Sept. 8, 1936.    A. L. FERGUSON ET AL    2,053,255
VEHICLE SAFETY HITCH
Original Filed May 23, 1931
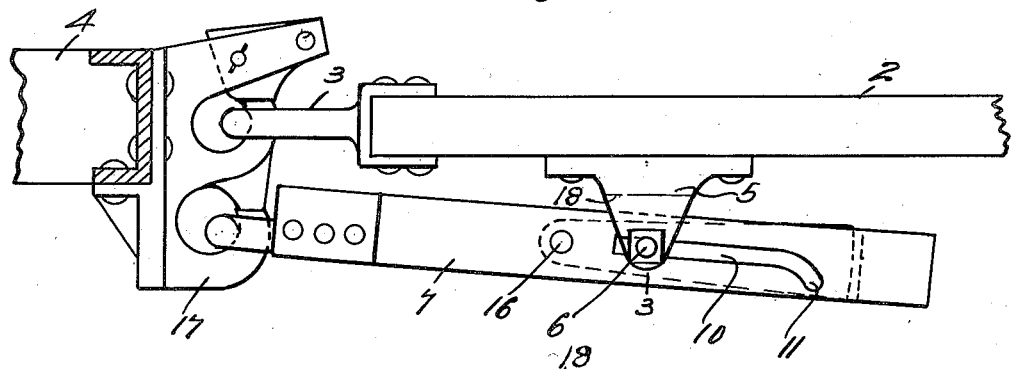
Fig. 1.
Fig. 3.
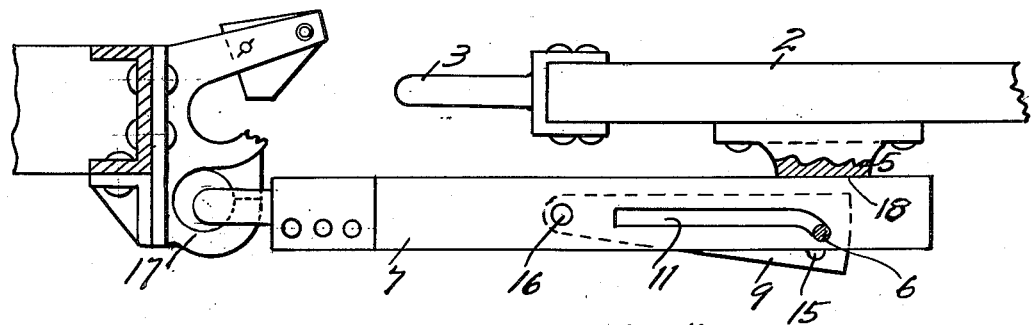
Fig. 2.
Fig. 4.
INVENTORS,
A. L. Ferguson and
BY H. D. Davis;
F. E. Maynard, ATTORNEY Patented Sept. 8, 1936

2,053,255

UNITED STATES PATENT OFFICE 2,053,255

VEHICLE SAFETY HITCH

Aaron L. Ferguson, Huntington Park, and Hernando D. Davis, Los Angeles, Calif.

Application May 23, 1931, Serial No. 539,494
Renewed February 12, 1936

7 Claims. (Cl. 280—33.44)

This invention relates to vehicle coupling apparatus and more especially to safety couplers.

It has been proposed to provide safety couplings between connected vehicles of various classes and especially to provide a supposed safety connection so that in the event of the breaking of the primary draft coupler then the auxiliary safety connection should come into effect as the connecting draft means. Several jurisdictions have passed laws necessitating the use of one kind or another of safety couplings, and to meet this requirement the operators of the vehicles have resorted to the mere connection of parts by a slack chain or piece of cable. This obviously is seriously objectionable, because if the main hitch breaks, the auxiliary hitch provides too much back-lash or play, back and forth between the connected vehicles, which may be motor trucks with attached trailers.

It is an object of the present invention to provide a safety coupler for vehicles in which there is employed a main normal draft hitch device with which is associated an auxiliary connector which parts are adapted to be automatically interlocked against back-lash or free to and fro movement in the event that the primary hitch device is rendered inoperative as by a breakage of its connection with the hauling vehicle.

In other words it is an object to provide a safety coupler including a main draft member to which is connected an auxiliary draft connection, normally inoperative and to provide a lock instrumentality whereby the two draft elements automatically lock themselves when the auxiliary connector is brought into draft effort.

The invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a side elevation showing the coupler in normal draft relation with the auxiliary connector ineffective.

Figure 2 is a side elevation, partly in section, showing the main draft hitch device as disconnected from the hauler and showing the auxiliary connector in effective draft, locked position.

Figure 3 is a cross-section on line 3—3 of Fig. 1.

Figure 4 is a side elevation showing in detail the safety lock latch of the coupler; the connecting pin being shown in cross-section.

In its illustrated adaptation the coupler includes a main tongue or hitch device 2 connected in any suitable manner to a trailer (not shown) and having at its front end a hook and eye or other suitable hitch means 3 whereby the draft tongue is coupled to a leading vehicle herein called the hauler 4 only a part of which is indicated and essential to illustrate the application of the invention.

On the lower part of the hitch tongue 2 is provided a suitable yoke 5 having a main cross pin 6 which passes through an auxiliary coupler or connector 7 here shown as having parallel sides 8—8 between which is freely movable a safety latch 9. The connector element 7 has its sides provided with elongated slots 10 which curve downwardly to the tail end 11, as clearly shown in Fig. 1, and receiving the cross pin 6.

The latch member 9, which is shown in detail in Fig. 4, is provided with a longitudinal slot 12 corresponding in form to the slots 10 in the side walls of the connector 7 but being distinguished therefrom by an upward extension 13 of the slot so as to form a stop shoulder 14 on the upper forward portion of the slot and above the downturned tail part 15 of the slot 12. The cross pin 6 of the hitch device 5 passes through the slot 12 and is designed to freely reciprocate in the slots to compensate for up and down weaving of the main tongue 2 and connector 7 during travel of the connected vehicles.

The safety latch 9 has its forward end mounted on a pivot 16 and trails rearwardly therefrom and is adapted to move down freely when the emergency arises. The forward end of the auxiliary connector 14 is connected by a hook and eye shackle device 17 at the rear end of the hauler 4 and is adapted to move pivotally thereon during operation of the hauler and trailer.

In the event that the shackle 3 should break down and thus free the hauler 4 from the coupler tongue 2 the latter will drop back and the pin 6 will ride freely rearwardly in the slotted connector 7 and latch 9 until it passes through the lower tail of the slots 11 thus drawing the auxiliary coupler up against the upper wall 18 Fig. 2 of the slotted yoke 5 eliminating all the vertical play between the auxiliary coupler 7 and the main hitch 2 and, with the result that the upper loop 13 of the slot in the latch 9 will drop down. Figs. 2 and 4, on the pin 6 so as to bring the stop shoulder 14 across the pin and this will therefore be prevented from back-lash or free movement and will lock the auxiliary connector 7 in effective draft position on the pin 6 and thereby transmit pull to the tongue 2 and draw the attached trailer.

It will be seen that the device provides for safely interlocking the main tongue 2 and the auxiliary connector 7 instantly upon breakage of connection between the main hitch 2 and the hauling vehicle 4. After such an interlocking of parts all back-lash between hauler and trailer is effectively prevented.

It is understood that the hitch means 3—17 may comprise a pair of hooks as shown in Fig. 1, on the hauler element of the hitch, or vice versa. As shown in Fig. 2, a hitch hook is on a coupler part 7 and an eye is on the hauler element 17.

What is claimed is:

1. A coupler for vehicles comprising a main hitch device, and an auxiliary hitch device, said auxiliary hitch device provided with lost motion, and locking means to automatically eliminate said lost motion in said auxiliary hitch device when said main hitch device becomes ineffective.

2. A coupler for vehicles comprising a main hitch device, and an auxiliary hitch device, said auxiliary hitch device provided with lost motion while said main hitch maintains effective draft and an automatic locking means to eliminate said lost motion in said auxiliary hitch device when said main hitch device becomes ineffective and said auxiliary hitch is brought into effective draft said locking means being actuated by effective draft through said auxiliary hitch.

3. A coupler for vehicles comprising a main hitch device, and an auxiliary hitch device, said auxiliary hitch device provided with lost motion and locking means to automatically eliminate said lost motion in said auxiliary hitch device.

4. A coupler for vehicles comprising a main hitch device, and an auxiliary hitch device, said auxiliary hitch device provided with lost motion while said main hitch maintains effective draft and locking means to automatically eliminate said lost motion in said auxiliary hitch device when said main hitch device becomes ineffective and said auxiliary hitch is brought into effective draft.

5. A coupler for vehicles comprising a main hitch device, and an auxiliary hitch device, said auxiliary hitch device provided with lost motion while said main hitch maintains effective draft and an automatically actuated locking means operted by exerting tension on said auxiliary hitch to eliminate said lost motion in said auxiliary hitch device when said main hitch device becomes ineffective and said auxiliary hitch is brought into effective draft.

6. A coupler for vehicles comprising a hitch device, and an auxiliary hitch device, said auxiliary hitch device having vertical play and locking means to eliminate said vertical play in said auxiliary hitch when said auxiliary hitch is rendered operative.

7. A coupler for vehicles comprising a main hitch and an auxiliary hitch device, said auxiliary hitch device having vertical and longitudinal play and locking means to eliminate said vertical and longitudinal play in said auxiliary hitch device when said main hitch device becomes ineffective.

AARON L. FERGUSON.
HERNANDO D. DAVIS.